(12) United States Patent
Hosokawa et al.

(10) Patent No.: US 11,409,102 B2
(45) Date of Patent: Aug. 9, 2022

(54) HEAD MOUNTED SYSTEM AND INFORMATION PROCESSING APPARATUS

(71) Applicant: CANON KABUSHIKI KAISHA, Tokyo (JP)

(72) Inventors: Hiroshi Hosokawa, Kanagawa (JP); Osamu Nomura, Kanagawa (JP); Shinichi Yamashita, Tokyo (JP); Hiroshi Yoshioka, Kanagawa (JP); Takeshi Ichikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/108,940

(22) Filed: Dec. 1, 2020

(65) Prior Publication Data

US 2021/0165214 A1    Jun. 3, 2021

(30) Foreign Application Priority Data

Dec. 3, 2019 (JP) .............................. JP2019-219074

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/014* (2013.01); *G02B 2027/0138* (2013.01); *G02B 2027/0178* (2013.01)

(58) Field of Classification Search
CPC ...... G02B 2027/0138; G02B 2027/014; G02B 2027/0178; G02B 27/0093; G02B 27/0172
See application file for complete search history.

(56) References Cited

U.S. PATENT DOCUMENTS

| | | | | |
|---|---|---|---|---|
| 7,744,216 B1* | 6/2010 | Uhlhorn | ................ | G06F 21/83 |
| | | | | 351/204 |
| 9,794,550 B2* | 10/2017 | Khabiri | ................ | H04N 13/128 |
| 10,796,147 B1* | 10/2020 | Hanna | ................ | G06K 9/00604 |
| 2002/0030888 A1* | 3/2002 | Kleinberger | ........... | G02B 30/31 |
| | | | | 359/465 |
| 2002/0101568 A1* | 8/2002 | Eberl | ................ | G02B 27/0172 |
| | | | | 351/211 |
| 2003/0082511 A1* | 5/2003 | Brown | ............... | G01N 33/6872 |
| | | | | 435/4 |
| 2005/0168569 A1* | 8/2005 | Igarashi | .................... | A61F 9/08 |
| | | | | 348/62 |
| 2007/0023617 A1* | 2/2007 | Thomas | ................ | H01J 31/507 |
| | | | | 250/214 VT |

(Continued)

FOREIGN PATENT DOCUMENTS

WO    2018/066225 A1    4/2018

*Primary Examiner* — Dmitriy Bolotin
(74) *Attorney, Agent, or Firm* — Canon U.S.A., Inc. I.P. Division (57) ABSTRACT

A head mounted system includes an eye imaging device configured to image an eye of a wearer of the head mounted system, a periphery imaging device configured to image a periphery of the wearer, a display device configured to display, toward the wearer, a peripheral image of the periphery of the wearer imaged by the periphery imaging device, and a control device configured to adjust display of the peripheral image on the display device based on an eye image of the eye of the wearer imaged by the eye imaging device.

11 Claims, 7 Drawing Sheets

(56) References Cited

U.S. PATENT DOCUMENTS

| | | | |
|---|---|---|---|
| 2011/0221656 A1* | 9/2011 | Haddick | G06Q 30/02 345/8 |
| 2013/0250086 A1* | 9/2013 | Mar | G02B 27/0093 348/78 |
| 2014/0055747 A1* | 2/2014 | Nistico | A61B 3/14 351/206 |
| 2014/0267284 A1* | 9/2014 | Blanche | G09G 3/003 345/428 |
| 2014/0356848 A1* | 12/2014 | Peterson | G09B 21/00 434/428 |
| 2015/0302773 A1* | 10/2015 | Stone | G02B 6/0035 348/63 |
| 2015/0370071 A1* | 12/2015 | Alton | G02B 27/0101 349/11 |
| 2016/0270648 A1* | 9/2016 | Freeman | A61B 3/032 |
| 2017/0079527 A1* | 3/2017 | Daneshi Kohan | A61B 3/0033 |
| 2017/0092007 A1* | 3/2017 | Goldberg | G06K 9/00597 |
| 2017/0252216 A1* | 9/2017 | Maeda | H04N 13/139 |
| 2017/0322422 A1* | 11/2017 | Stone | G02B 27/027 |
| 2018/0249151 A1* | 8/2018 | Freeman | A61B 5/1123 |
| 2018/0333092 A1* | 11/2018 | Roshan | A61B 5/18 |
| 2019/0042698 A1* | 2/2019 | Pohl | G06F 16/436 |
| 2019/0056780 A1* | 2/2019 | Bombard | G06T 19/006 |
| 2019/0130869 A1* | 5/2019 | Chang | G09G 5/024 |
| 2019/0235283 A1* | 8/2019 | Tuan | G02C 11/10 |
| 2019/0333109 A1* | 10/2019 | Teller | G06Q 30/0267 |
| 2020/0275071 A1* | 8/2020 | Zavoyskikh | G02B 27/0179 |
| 2020/0281455 A1* | 9/2020 | Zimanyi | A61B 3/113 |
| 2020/0285074 A1* | 9/2020 | Zimanyi | G02B 27/0093 |

\* cited by examiner

HEAD MOUNTED SYSTEM AND INFORMATION PROCESSING APPARATUS

BACKGROUND

Field of the Disclosure

The present disclosure generally relates to a head mounted system and an information processing apparatus.

Description of the Related Art

There is known a wearable device including a display device called a head mounted display or smart glasses. As shown in International Publication No. 2018/066225, in one system of such a wearable device, an image around a wearer is captured by an imaging device and displayed on a display device. According to this system, a user can obtain a feeling as if he/she directly saw the periphery via the display device. In addition, when an image obtained by an imaging device capable of high-sensitivity imaging is displayed on a display device, the user can act similarly even during midnight as in the daytime.

In the wearable device described in International Publication No. 2018/066225, the image obtained by the imaging device is directly displayed on the display device. For this reason, the image is displayed using the same settings for all wearers. However, the eye situation changes depending on the wearer. In addition, the eye situation can change for the same wearer with the elapse of the time.

SUMMARY

One aspect of the present disclosure is to provide a technique capable of displaying the periphery depending on an eye situation of a wearer.

According to an embodiment, there is provided a head mounted system comprising an eye imaging device configured to image an eye of a wearer of the head mounted system; a periphery imaging device configured to image a periphery of the wearer; a display device configured to display, toward the wearer, a peripheral image of the periphery of the wearer imaged by the periphery imaging device; and a control device configured to adjust display of the peripheral image on the display device based on an eye image of the eye of the wearer imaged by the eye imaging device.

Further features of the present disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed disclosure. Multiple features are described in the embodiments, but the disclosure does not require all such features, and multiple such features may be combined as appropriate. Furthermore, in the attached drawings, the same reference numerals are given to the same or similar configurations, and redundant description thereof is omitted.

Figure 1:
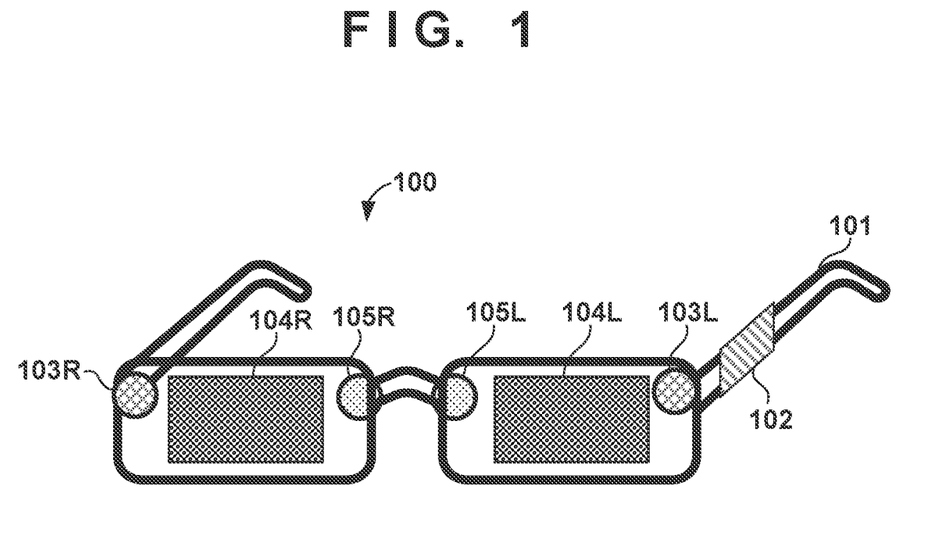
FIG. 1 is a schematic view for explaining the arrangement example of a head mounted system according to an embodiment of the present disclosure.

The arrangement example of a head mounted system 100 according to some embodiments will be described with reference to FIG. 1. The head mounted system 100 is a system used while the system is mounted on a human's head portion. The head mounted system 100 shown in FIG. 1 has a shape of glasses. That is, a frame 101 can be put on the ears and nose of a wearer, so that the head mounted system 100 can be supported on the head portion of the wearer. In place of this, the head mounted system 100 may have a shape such as goggles or a helmet.

The head mounted system 100 includes a control device 102, periphery imaging devices 103R and 103L, display devices 104R and 104L, and eye imaging devices 105R and 105L. The periphery imaging devices 103R and 103L are generally called a periphery imaging device 103. In the following description for the periphery imaging device 103, the periphery imaging device 103 covers each of the periphery imaging device 103R and the periphery imaging device 103L. Similarly, the display devices 104R and 104L are generally called a display device 104, and the eye imaging devices 105R and 105L are generally called an eye imaging device 105. The control device 102, the periphery imaging device 103, the display device 104, and the eye imaging device 105 are attached to the frame 101.

The control device 102 controls the overall operation of the head mounted system 100. The control device 102 may include a battery for supplying power to each component of the head mounted system 100 and a communication device for communicating with a another device except the head mounted system 100.

The periphery imaging device 103 images the periphery of the wearer. The periphery need not be all of the periphery of the wearer, but may be part of it. The periphery imaging device 103 is typically attached to a position where the front of the wearer can be imaged. Depending on the application purpose of the periphery imaging device 103, the periphery imaging device 103 may be attached to a position where the lateral, upper, or rear side of the wearer can be imaged. The periphery imaging device 103L is attached to the left lens position of the frame 101 and images the periphery viewed from the left eye side of the wearer. The periphery imaging device 103R is attached to the right lens position of the frame 101 and images the periphery viewed from the right eye side of the wearer. The lens position is a position where the lens would be attached in normal glasses. As will be described later, since the image around the wearer is displayed on the display device 104, the wearer need not directly recognize the periphery. For this reason, the head mounted system 100 need not include lenses, and an opaque support plate may be provided at the lens position.

The display device 104 displays an image on the side facing the wearer. The image to be displayed may be a still image or moving image. The display device 104L is attached to the left lens position of the frame 101 and displays the image toward the left eye of the wearer. The display device 104R is attached to the right lens position of the frame 101 and displays the image toward the right eye of the wearer.

The eye imaging device 105 images an eye of the wearer. The eye of the imaging target may include an eyeball and an eyelid. The eye imaging device 105 is attached to a position where the eye of the wearer can be imaged. The eye imaging device 105L is attached to the left lens position of the frame 101 and images the left eye of the wearer. The eye imaging device 105R is attached to the right lens position of the frame 101 and images the right eye of the wearer.

Figure 2:
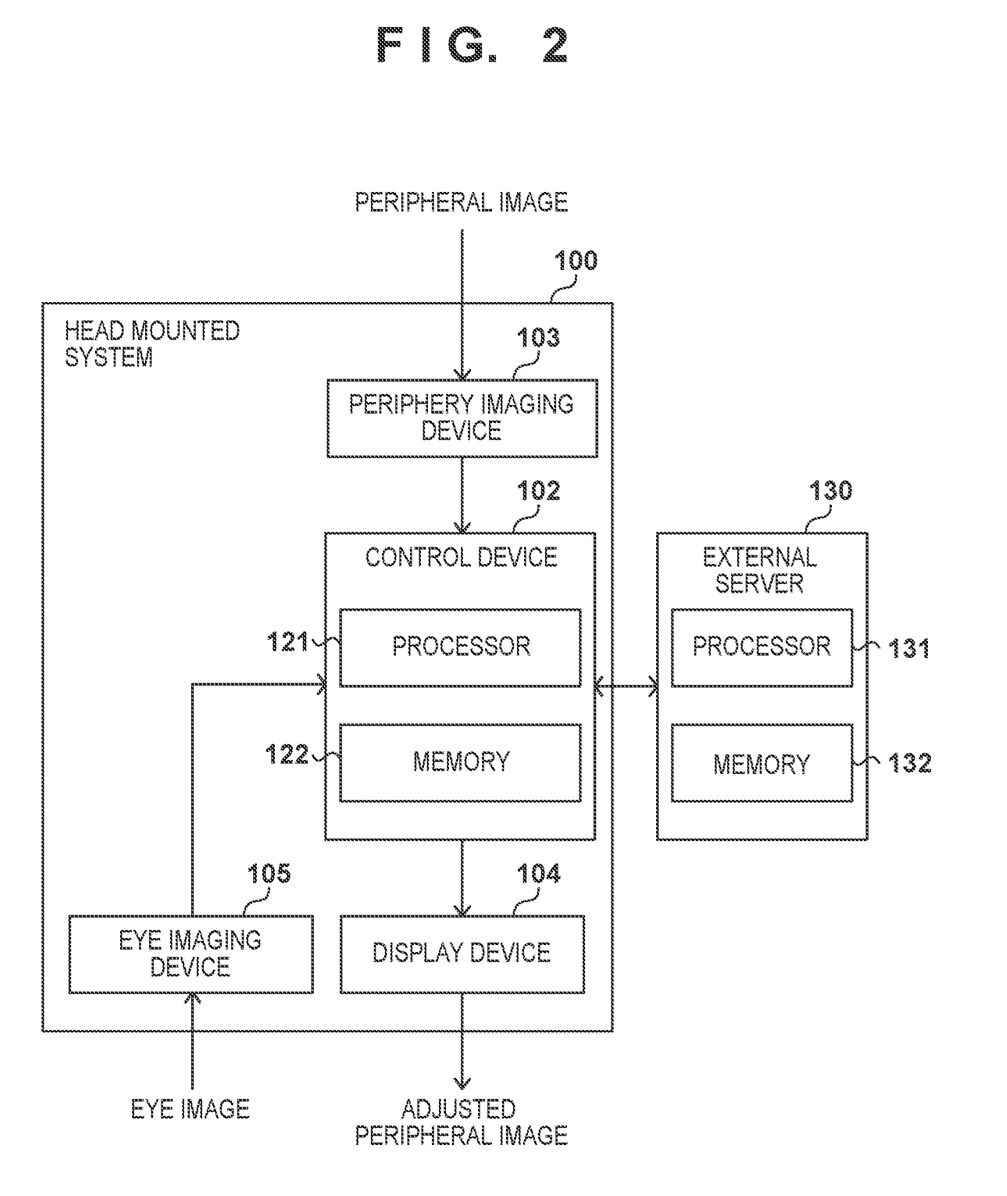
FIG. 2 is a block diagram for explaining the outline of the operation of the head mounted system according to the embodiment of the present disclosure.

The outline of the operation of the head mounted system 100 will be described with reference to FIG. 2. The control device 102 includes a processor 121 and a memory 122. The operation of the control device 102 can be performed by causing the processor 121 to execute the program stored in the memory 122. Alternatively, some or all of the operations of the control device 102 may be executed by a dedicated processing circuit such as an ASIC (Application Specific Integrated Circuit) or an FPGA (Field Programmable Gate Array). The control device 102 controls the operations of the periphery imaging device 103, the display device 104, and the eye imaging device 105.

The periphery imaging device 103 supplies, to the control device 102, the image of the periphery (to be referred to as a peripheral image hereinafter) obtained by imaging the periphery of the wearer. The control device 102 supplies this peripheral image to the display device 104. The display device 104 displays the peripheral image toward the wearer. In addition, the eye imaging device 105 supplies, to the control device 102, the image of the eye obtained by imaging the eye of the wearer. Based on the eye image, the control device 102 adjusts the display of the periphery in the display device 104. The control device 102 may adjust the display of the periphery in the display device 104 by changing at least one of an imaging parameter of the periphery imaging device 103, processing for the peripheral image, and/or the display parameter of the display device 104. For example, the display of the periphery may be adjusted by changing the zoom, stop, focal length, and the like of the periphery imaging device 103. In addition, the display of the periphery may be adjusted by performing color tone change and enlargement/reduction of the peripheral image. In addition, the display of the periphery may be adjusted by changing the luminance, lightness, color, central position of the display in the display device 104. The detailed example of the adjustment method will be described later.

Figure 3:
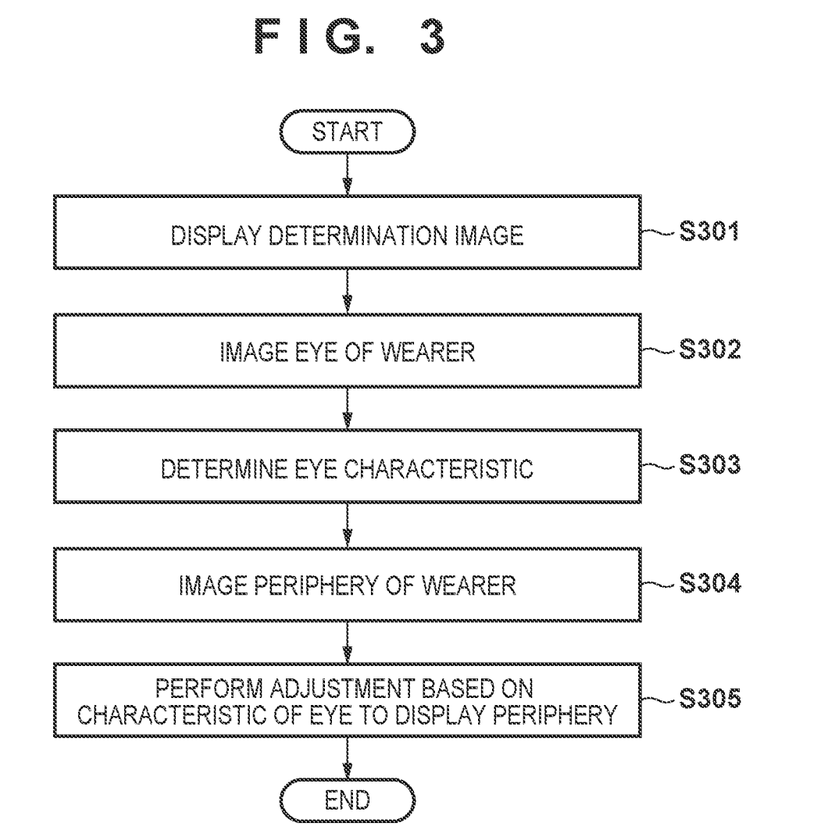
FIG. 3 is a flowchart for explaining the details of the operation of the head mounted system according to the embodiment of the present disclosure.

The details of the operation of the head mounted system 100 will be described with reference to FIG. 3. In some embodiments, the head mounted system 100 can be operated in a determination mode and a use mode. The determination mode is an operation mode for causing the eye imaging device 105 to image the eye of the wearer and causing the control device 102 to determine the characteristic of the eye based on the image of the eye. The use mode is an operation mode for causing the periphery imaging device 103 to image the periphery, causing the control device 102 to adjust the display based on the characteristic of the eye and causing the display device 104 to display the peripheral image. In the operation of FIG. 3, steps S301 to S303 are processes in the determination mode, and steps S304 and S305 are processes in the use mode.

In step S301, the control device 102 displays a determination image on the display device 104. The determination image is an image used to determine the characteristic of the eye of the wearer. The characteristic of the eye may include at least one of, for example, squint (strabismus), color blindness, night blindness, sight, and/or astigmatism. The determination image may be stored in the memory 122 in advance or may be obtained from an external server 130.

In step S302, the control device 102 uses the eye imaging device 105 to obtain the image of the eye of the wearer who views the determination image. In step S303, the control device 102 determines the characteristic of the eye based on the image of the eye.

In step S304, the control device 102 uses the periphery imaging device 103 to obtain the image of the periphery of the wearer. In step S305, the control device 102 performs adjustment based on the characteristic of the eye to display the peripheral image on the display device 104. The control device 102 repeats steps S304 and S305, so that a moving image can be displayed on the display device 104.

The above method may be executed by the head mounted system 100 singly or may be executed by the cooperation of the head mounted system 100 and the external server 130. The head mounted system 100 (more specifically, its control device 102) and the external server 130 can communicate with each other (particularly wireless communication). The external server 130 is a computer (the information processing apparatus) including a processor 131 and a memory 132. The operation of the external server 130 may be performed by causing the processor 131 to execute the program stored in the memory 132. Alternatively, some or all of the operations of the external server 130 may be executed by a dedicated processing circuit such as an ASIC or FPGA. When the above method is cooperatively performed, for example, in step S303, the control device 102 transmits the determination image and the image of the eye to the external server 130, and the external server 130 determines the characteristic of the eye based on the determination image and the image of the eye and transmits the determination result to the control device 102. In step S305, the control device 102 adjusts the display of the periphery on the display device 104 based on the received eye characteristic (that is, the response from the external server 130). If the determination image to be used is shared in advance between the control device 102 and the external server 130, the control device 102 need not transmit the determination image in step S303.

The detailed example of the operation of the head mounted system 100 will be described with reference to FIGS. 4A to 5B. In the detailed example of FIGS. 4A to 4C, the control device 102 determines based on the eye image imaged by the eye imaging device 105 whether the eye has a squint. If the control device 102 determines that the eye has a squint, the control device 102 adjusts the position of the peripheral image displayed on the display device 104.

Figure 4A:
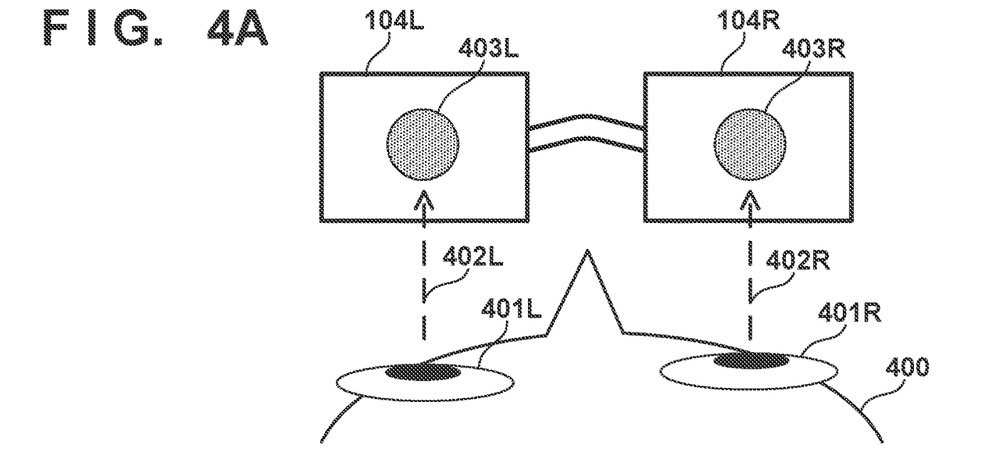
FIGS. 4A to 4C are schematic views for explaining the detailed example of the operation of the head mounted system according to the embodiment of the present disclosure.

More specifically, as shown in FIG. 4A, the control device 102 displays a mark 403L at the center of the display device 104L and a mark 403R at the center of the display device 104R. In addition, the control device 102 gives an instruction for prompting a wearer 400 to view the marks 403L and 403R. This instruction may be made by displaying a sentence on the display device 104 or may be made by a voice.

As a result, a sight line 402L of a left eye 401L of the wearer 400 is directed to a mark 503L, and a sight line 402R of a right eye 401R of the wearer 400 is directed to a mark 503R.

Figure 4B:
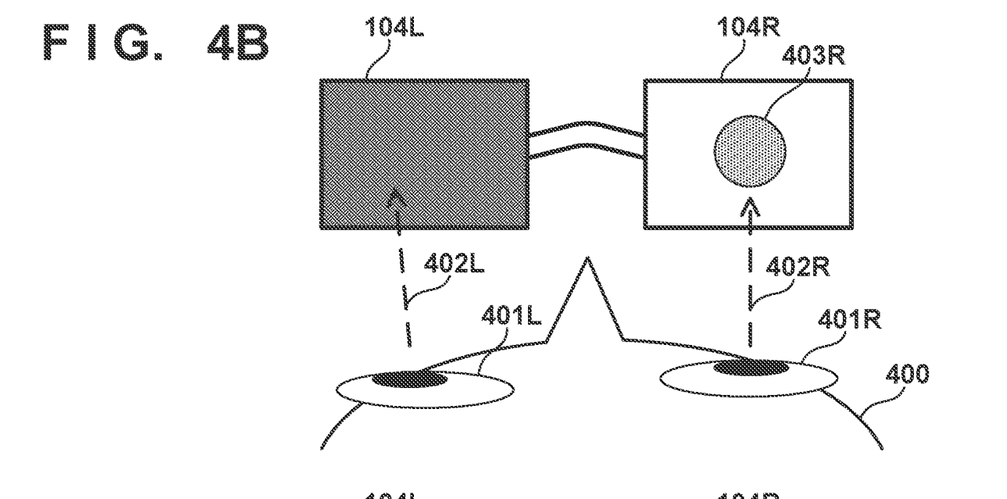

Subsequently, as shown in FIG. 4B, the control device 102 sets the display device 104L in a non-display state. If the wearer 400 has a squint, the sight line 402L of the left eye 401L is shifted. For this reason, based on the change in the sight line 402L, the control device 102 determines the direction and angle of the squint. If this angle exceeds a threshold, the control device 102 determines that the wearer has a squint. Similarly, the control device 102 determines the presence/absence of a squint for the right eye 401R. The above operation corresponds to the determination mode (that is, steps S301 to S303) of FIG. 3.

Figure 4C:
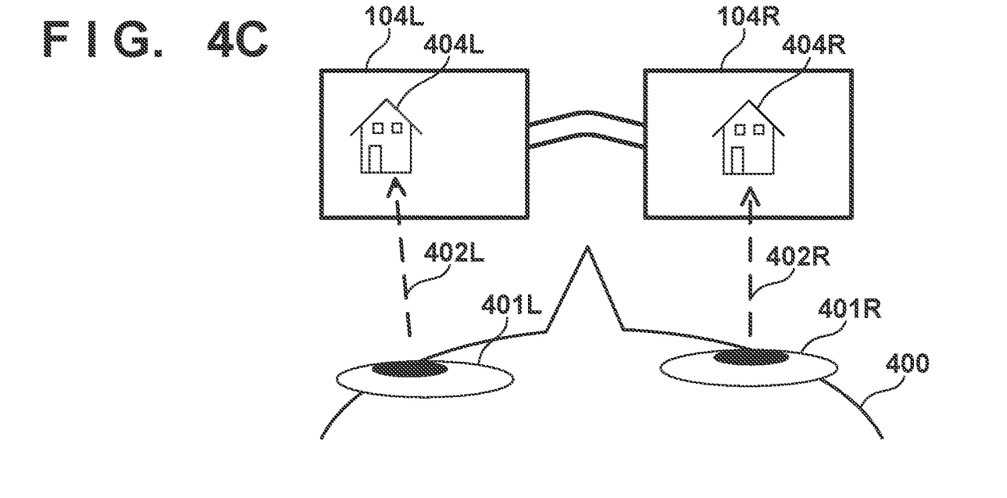

Assume that as the result of determination, the left eye 401L has a squint, and the right eye 401R does not have a squint. In this case, as shown in FIG. 4C, the control device 102 adjust the display states of peripheral images 404R and 404L such that the center of the peripheral image 404R is displayed at the center in the display device 104R and the center of the peripheral image 404L is shifted to the left in the display device 104L. This adjustment may be performed by changing the lens direction of the periphery imaging device 103L, shifting the center of the peripheral image 404L by image processing, or shifting the display position of the image by the display device 104L. By this adjustment, the wearer 400 having a squint can view the peripheral image 404L with his/her natural sight line, and the eye strain can be reduced.

Figure 5A:
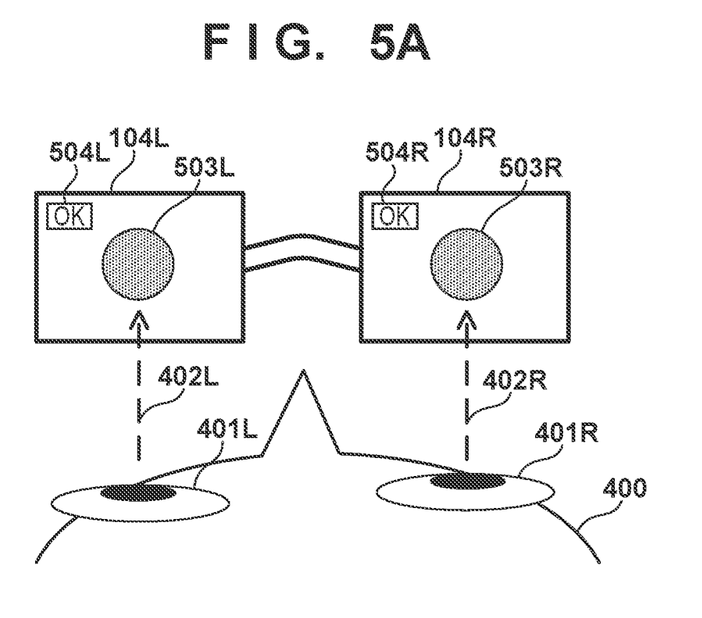
FIGS. 5A and 5B are schematic views for explaining the detailed example of the operation of the head mounted system according to the embodiment of the present disclosure.
Figure 5B:
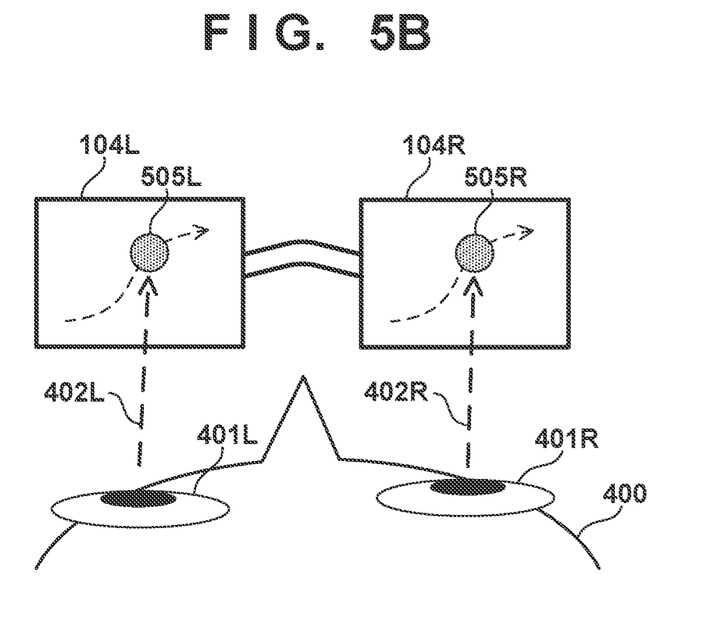

In the detailed example of FIGS. 5A and 5B, the control device 102 determines based on the eye image captured by the eye imaging device 105 whether the eye has color blindness. If the control device 102 determines that the eye has color blindness, the color of the peripheral image displayed on the display device 104 is changed to allow the wearer 400 to recognize the image.

In the detailed example shown in FIG. 5A, the control device 102 displays the mark 503L at the center of the display device 104L. The mark 503L is displayed in a color which cannot be recognized by the wearer 400 who has color blindness. In addition, the control device 102 displays a confirmation region 504L at a part (the upper left position in the example of FIG. 5A) of the display device 104L. The control device 102 gives an instruction for prompting the wearer 400 to view the confirmation region 504L when the mark 503L is displayed. This instruction may be performed by displaying a message on the display device 104 or may be made by a voice. If the sight line 402L of the left eye 401L of the wearer 400 is shifted from the mark 503L to the confirmation region 504L, the control device 102 determines that the wearer 400 does not have color blindness. If the movement of the sight line 402L cannot be confirmed, the control device 102 determines that the wearer 400 has color blindness. The right eye 401R is similarly determined by displaying the mark 503R and a confirmation region 504R on the display device 104R.

In the detailed example shown in FIG. 5B, the control device 102 displays a mark 505L which is moving on the display device 104L. The mark 505L is displayed in a color which cannot be recognized by the wearer 400 who has color blindness. The control device 102 gives an instruction for prompting the wearer 400 to continuously view the mark 503L. This instruction may be performed by displaying a message on the display device 104 or may be made by a voice. If the sight line 402L of the left eye 401L of the wearer 400 follows the movement of the mark 505L, the control device 102 determines that the wearer 400 does not have color blindness. On the other hand, if the movement of the sight line 402L cannot be confirmed, the control device 102 determines that the wearer 400 has color blindness. The right eye 401R is similarly determined by displaying a mark 505R on the display device 104R.

If the control device 102 determines that the wearer 400 has color blandness, the control device 102 allows the wearer 400 to recognize the color of the peripheral image displayed on the display device 104. For example, the control device 102 may change the color which cannot be recognized by the wearer 400 into another color. Alternatively, the control device 102 may superimpose a character representing the type of the unrecognized color on the region of the color which cannot be recognized by the wearer 400.

Subsequently, determination of another characteristic will be described. The control device 102 determines based on an eye image captured by the eye imaging device 105 whether the eye has night blindness. If the control device 102 determines that the eye has night blindness, the lightness or luminance of the peripheral image displayed on the display device 104 may be adjusted. The determination for determining whether the eye of the wearer has night blindness is performed by displaying the mark 503L or 505L in the determination method of FIG. 5A or 5B. In addition, whether the eye of the wearer has sight or astigmatism can similarly be determined by changing the mark 503L or 505L in accordance with the determination result.

Figure 6:
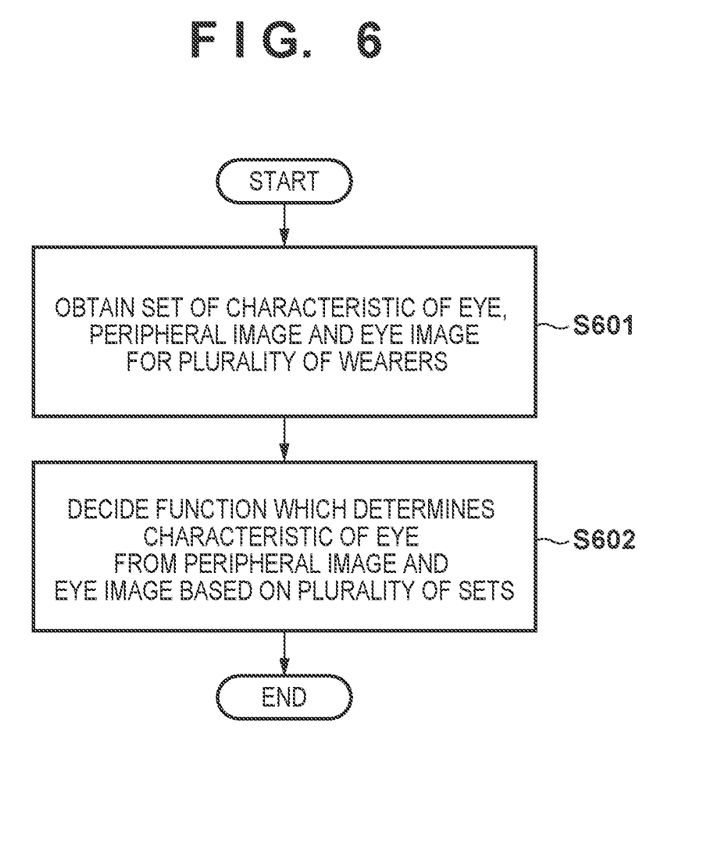
FIG. 6 is a flowchart for explaining the details of the operation of an information processing apparatus according to the embodiment of the present disclosure.

Another method of determining the characteristic of an eye will be described with reference to FIG. 6. This method may be executed by the control device 102 or the external server 130. In the following description, a case in which the method is executed by the external server 130 will be described below.

In step S601, the external server 130 obtains a set including the characteristic of an eye of each individual person, an image obtained by imaging the periphery of each individual person, and an image obtained by imaging the eye of each individual person. A person of the collection target of such data will be called a sample provider. The sample provider may collect data using the head mounted system 100. More specifically, the sample provider registers his/her own characteristics (for example, the direction and angle of squint, the presence/absence of color blindness, and the like) of the eye to the control device 102. The head mounted system 100 transmits, to the external server 130, the image of the periphery of the sample provider imaged by the periphery imaging device 103 and the image of the eye of the sample provider imaged by the eye imaging device 105 together with the characteristics of the sample provider. The external server 130 collects such data from the sample provider having a variety of characteristics. More specifically, the external server 130 collects data from a person having a predetermined characteristic (for example, color blindness) and a person who does not have this characteristic.

Since the display device 104 is not used to obtain data in step S601, the sample provider can obtain the data using a head mounted system having no display device 104. In this case, the eye image obtained while the sample provider is directly viewing the periphery is provided to the external server 130 together with this peripheral image. On the other hand, if the sample provider uses the head mounted system 100, the eye image obtained while the sample provider is viewing the peripheral image displayed on the display device 104 is provided to the external server 130 together with this peripheral image.

In step S602, the external server 130 decides a function which receives a set of images including an image obtained by imaging the periphery of a person (the determination target) and an image obtained by imaging the eye of this person and determines, based on the plurality of collected sets, whether this person has a predetermined characteristic. In the following description, this function is called characteristic determination function. The characteristic determination function is decided by, for example, machine learning. For example, a function having, as input data, the peripheral image and eye image of the collected data, and as output data, the presence/absence of each characteristic (squint or color blindness) is expressed by a neural network. The external server 130 decides the parameters of this neural network using, as correct answer data, the presence/absence of the characteristic provided by the sample provider.

A method of adjusting the display in the display device 104 using the characteristic determination function will be described with reference to FIG. 7. In step S701, the control device 102 of the head mounted system 100 mounted on a determination target person obtains the peripheral image obtained by the periphery imaging device 103 and displays the peripheral image on the display device 104. In addition, the control device 102 obtains the eye image obtained by the eye imaging device 105 during display of the peripheral image on the display device 104.

In step S702, the control device 102 transmits the peripheral image and the eye image obtained in step S701 to the external server 130, and the external server 130 receives these images.

In step S703, the external server 130 inputs the peripheral image and the eye image to the characteristic determination function to determine the eye characteristic of the determination target person. In step S704, the external server 130 decides the display adjustment method in the display device 104 based on the eye characteristic.

In step S705, the external server 130 transmits the display method to the control device 102, and the control device 102 receives this display method. In step S706, the control device 102 obtains the peripheral image obtained by the periphery imaging device 103. In step S707, the control device 102 adjusts the peripheral display on the display device 104 in accordance with the received adjustment method.

The control device 102 repeats steps S706 and S707, so that a moving image can be displayed on the display device 104. In addition, if the operations of steps S701 to S705 are periodically (for example, once a month) performed, the control device 102 can cope with a temporal change in the eye characteristic of the determination target person. In step S704, in place of the operation in the external server 130, the operation may be performed by the control device 102. Step S703 may similarly be performed by the control device 102 in place of the external server 130.

Figure 7:
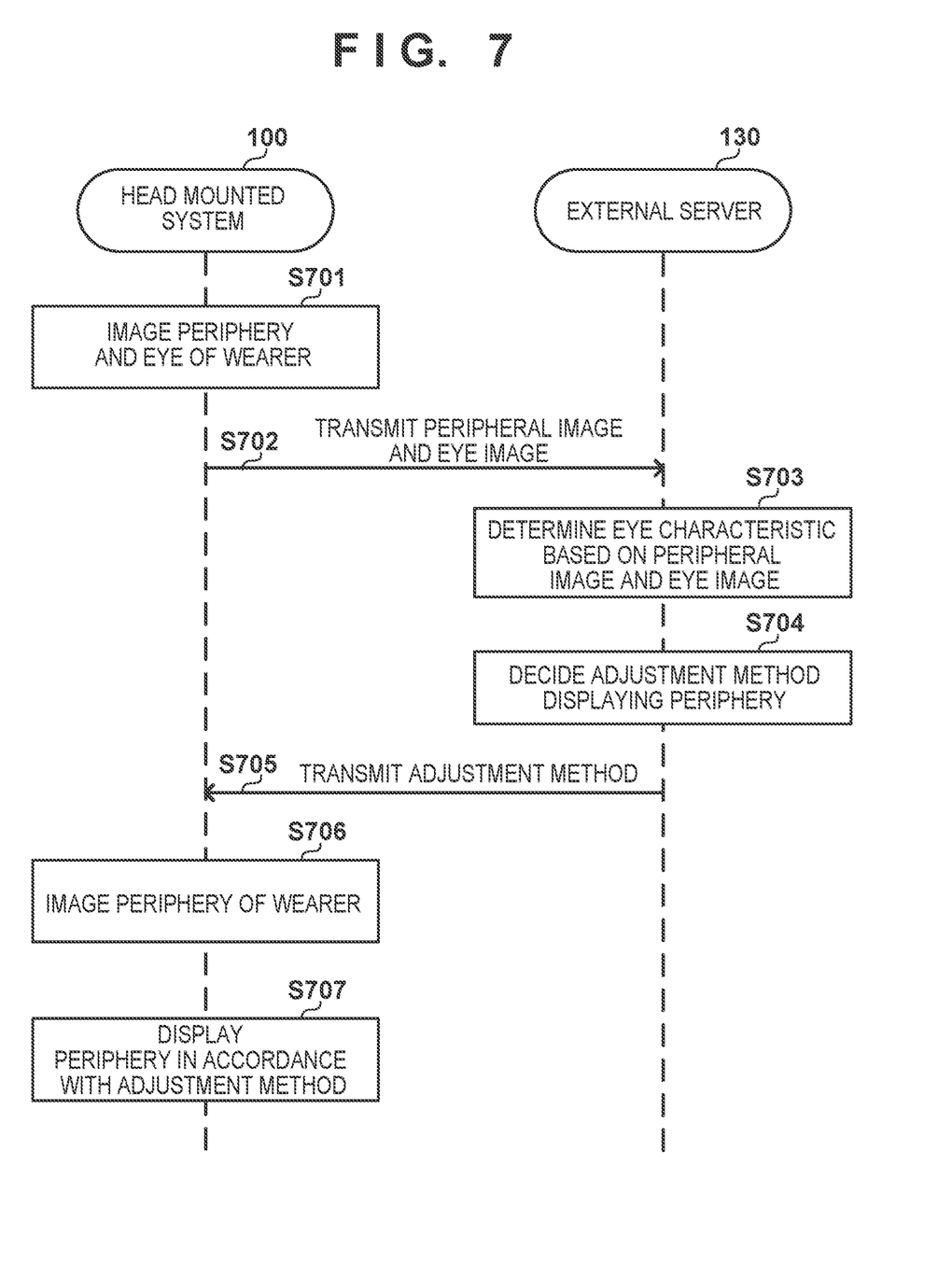
FIG. 7 is a flowchart for explaining the details of the operation of the head mounted system according to the embodiment of the present disclosure.

According to the method of FIG. 7, without displaying the determination image shown in FIGS. 4A to 5B, the eye characteristic of the wearer can be determined in a normal use state (that is, while the peripheral image is being displayed on the display device 104).

At least one of the eye imaging device 105, the periphery imaging device 103, and/or the display device 104 may be detachable from the head mounted system 100. For example, the eye imaging device 105 is not used until the next determination after the eye characteristic of the wearer is determined. For this reason, in order to reduce the power consumption, the power supply of the eye imaging device 105 may be turned off, or the eye imaging device 105 itself may be detached. In addition, since the display device 104 is not used in collection of the sample data described with reference to FIG. 6, the display device 104 may be detached. In addition, since the periphery imaging device 103 is not used in the determination mode (steps S301 to S303) in FIG. 3, the power supply of the periphery imaging device 103 may be turned off, or the periphery imaging device 103 itself may be detached in order to reduce the power consumption.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-219074, filed Dec. 3, 2019, which is hereby incorporated by reference herein in its entirety.

What is claimed is:

1. A head mounted system comprising:
    an eye imaging device configured to image an eye of a wearer of the head mounted system;
    a periphery imaging device configured to image a periphery of the wearer;
    a display device configured to display, toward the wearer, a peripheral image of the periphery of the wearer imaged by the periphery imaging device; and
    a control device configured to adjust display of the peripheral image on the display device based on an eye image of the eye of the wearer imaged by the eye imaging device,
    wherein the control device adjusts the display of the peripheral image on the display device by changing at least an imaging parameter of the periphery imaging device.

2. The system according to claim 1, wherein the control device adjusts the display of the peripheral image on the display device by further changing processing for the peripheral image, or a display parameter of the display device.

3. The system according to claim 1, wherein
the head mounted system can operate in a plurality of modes including a determination mode in which the eye imaging device images the eye, and
a use mode in which the periphery imaging device images the periphery, and the display device displays the peripheral image.

4. The system according to claim 1, wherein the control device adjusts display of the peripheral image, based on the eye image imaged during display of the peripheral image on the display device.

5. The system according to claim 1, wherein
the control device
determines a characteristic of the eye based on the eye image, and
adjusts display of the peripheral image on the display device based on the characteristic of the eye.

6. The system according to claim 5, wherein the characteristic of the eye includes at least one of squint, color blindness, night blindness, sight, and astigmatism.

7. The system according to claim 1, wherein
the control device
determines based on the eye image whether the eye has a squint, and
adjusts a position of the peripheral image displayed on the display device in a case where the control device determines that the eye has a squint.

8. The system according to claim 1, wherein
the control device
determines based on the eye image whether the eye has color blindness, and
allows the wearer to recognize a color of the peripheral image displayed on the display device in a case where the control device determines that the eye has color blindness.

9. The system according to claim 1, wherein
the control device
determines based on the eye image whether the eye has night blindness, and
adjusts one of lightness and luminance of the peripheral image displayed on the display device in a case where the control device determines that the eye has night blindness.

10. The system according to claim 1, wherein at least one of the eye imaging device, the periphery imaging device, and the display device is detachable from the head mounted system.

11. The system according to claim 1, wherein
the control device
transmits the eye image to an external server, and
adjusts display of the peripheral image on the display device based on a response from the external server.

* * * * *